Figures 1, 2:
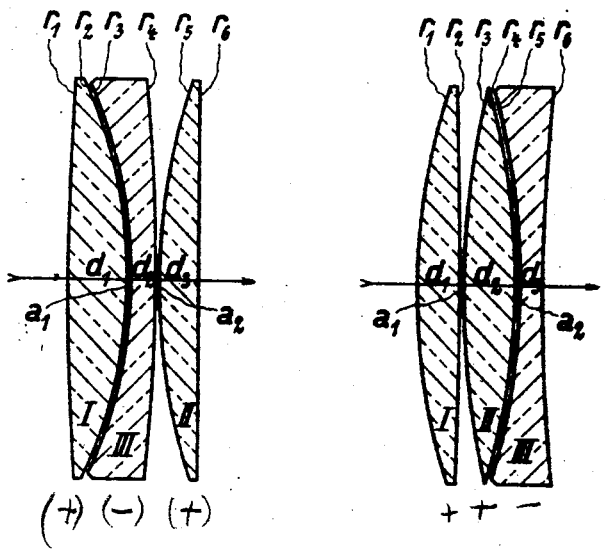

Feb. 8, 1927.

A. KÖNIG 1,616,751

TELESCOPE OBJECTIVE

Filed Sept. 22. 1921

Inventor:
Albert König

Patented Feb. 8, 1927.

1,616,751

UNITED STATES PATENT OFFICE.

ALBERT KÖNIG, OF JENA, GERMANY, ASSIGNOR TO THE FIRM OF CARL ZEISS, OF JENA, GERMANY.

TELESCOPE OBJECTIVE.

Application filed September 22, 1921, Serial No. 502,547, and in Germany October 18, 1920.

The present invention relates to objectives for telescopes in which a particularly short length is strived for, as is, e. g., the case in theodolite-telescopes in consideration of their capability of being turned over about their horizontal axis. In such telescopes, in order to attain a sufficient brightness with the requisite magnification, a comparatively large aperture of the objective is required, which aperture does generally not admit of attaining with the types of objectives already known a sufficient elimination of the spherical aberrations. The invention affords a new objective which, in addition to the correction of the chromatic aberrations and the fulfilment of the sine condition, also possesses only very small spherical aberrations even for large apertures. For this purpose objectives are used which are composed of three single lenses having at the most one cemented surface, viz. of two collective lenses and one dispersive lens, the distances apart of the lenses and in each lens the thickness in the axis being not larger than at the most one-fourth of the free aperture of the objective and the dispersive lens having a refractive power of at the most two-thirds of the total refractive powers of the collective lenses. The object strived for of a sufficient freedom of zones is attained by fulfilling the following conditions: The one collective lens forms with the dispersive lens a cemented surface with dispersive effect or a pair of adjoining surfaces with negative refractive power; the other collective lens has a convex front surface and a focal length equal to from 0.6 to 1.5 times the amount of the total focal length of the objective and it forms with the adjoining lens a pair of adjoining surfaces, the refractive power of which is positive and larger than one-fourth of that of the objective. The succession of the three lenses is optional; the dispersive lens may be either disposed in front of, or behind or between the collective lenses. The construction of the new objective will be especially favorable, if that collective lens which forms with the dispersive lens a cemented surface having dispersive effect or a pair of adjoining surfaces having negative refractive power, consists of a glass, the refractive index of which for the line D of the solar spectrum is by at least 0.05 smaller than the corresponding refractive index of the dispersive lens.

If the object be destined for a telescope, in which the adjustment for different distances is effected by means of a dispersive lens displaceably disposed between the objective and its focal plane, the defects still to be found in the objective can be suitably compensated by the oposite defects of the displaceable dispersive lens in which case, however, the refractive power of this dispersive lens should not be too high, i. e. at the most such as to produce a triple magnification of the image of the objective.

The annexed drawing shows two constructional examples of the invention in which in either case the three lenses without cementing are disposed one behind the other with intervals of air. Fig. 1 shows an example in which the dispersive lens III is disposed between the two collective lenses I and II, whilst Fig. 2 illustrates a form in which the dispersive lens III is inserted behind the two collective lenses I and II.

The radii of curvature, thicknesses, distances and refractive powers of the two examples are given in the following tables, all values are applied to a total focal length of the objective $=100$, i. e. a refractive power of 1/100. The refractive powers are thereby designated by the radii of the appertaining boundary surfaces, e. g. the sign $r_1$, $r_2$ means the refractive power of the lens I, while the sign $r_2$, $r_3$ means the refractive power of the air lens formed between the lenses I and II. The available aperture of the objective has a diameter of 40, so as to yield a ratio of aperture of 1:2,5. In either example the two collective lenses I and II consist of the same glass, all having a value of the refractive index for the lines C, D and F of the solar spectrum: $n_C=1,50762$, $n_D=1,5100$ and $n_F=1,51559$; the glass of the dispersive lens III has in both forms the values $n_C=1,64343$, $n_D=1,6489$ and $n_F=1,66262$. The refractive powers pertain to $n_D$.

Radii of curvature, distances, thicknesses and refractive powers.

1. Example (Fig. 1).

$r_1 = +321$   $d_1 = 6$     $r_1, r_2 = +0{,}0125$
$r_2 = -46{,}59$ $a_1 = 0{,}05$ $r_2, r_3 = -0{,}00285$
$r_3 = -47{,}05$ $d_2 = 2{,}5$  $r_3, r_4 = -0{,}0103$
$r_4 = -192{,}3$ $a_2 = 0{,}1$  $r_4, r_5 = +0{,}0113$
$r_5 = +64{,}3$  $d_3 = 4$      $r_5, r_6 = +0{,}0079$
$r_6 = \pm$

2. Example (Fig. 2).

$r_1 = +64{,}3$  $d_1 = 4{,}3$  $r_1, r_2 = +0{,}0090$
$r_2 = -480$     $a_1 = 0{,}1$  $r_2, r_3 = +0{,}00692$
$r_3 = +87$      $d_2 = 5{,}3$  $r_3, r_4 = +0{,}0130$
$r_4 = -69{,}7$  $a_2 = 0{,}1$  $r_4, r_5 = -0{,}00183$
$r_5 = -70{,}9$  $d_3 = 2{,}4$  $r_5, r_6 = -0{,}0125$
$r_6 = +195$

I claim:

1. Telescope objective, corrected spherically, chromatically and with regard to the sine condition and consisting of three single lenses, viz, two collective lenses and one dispersive lens, all thicknesses and distances of these lenses not being larger than at the most one-fourth each of the free aperture of the objective, and the said dispersive lens having a refractive power of at the most two-thirds of the total refractive powers of the said collective lenses, the surfaces facing each other of one of the said collective lenses and of the dispersive lens being so formed as to disperse the rays passing from this collective lens to the dispersive lens and a pair of adjoining surfaces being formed by the other of the said collective lenses with the adjoining lens, the refractive power of the said pair of adjoining surfaces being positive and larger than one-fourth of that of the objective.

2. Telescope objective consisting of three single lenses, viz, two collective lenses and one dispersive lens, all thicknesses and distances of these lenses not being larger than at the most one-fourth each of the free aperture of the objective, and the said dispersive lens having a refractive power of at the most two-thirds of the total refractive powers of the said collective lenses, one of the said collective lenses consisting of a glass, the refractive index of which for the line D of the solar spectrum is by at least 0,05 smaller than the corresponding refractive index of the said dispersive lens, the surfaces of this collective lens and of the dispersive lens being so formed as to disperse the rays passing from this collective lens to the dispersive lens and a pair of adjoining surfaces being formed by the other of the said collective lenses with the adjoining lens, the refractive power of the said pair of adjoining surfaces being positive and larger than one-fourth of that of the objective.

ALBERT KÖNIG.